(12) United States Patent
Chen et al.

(10) Patent No.: US 10,489,704 B2
(45) Date of Patent: Nov. 26, 2019

(54) OPERATION UNIT, METHOD AND DEVICE CAPABLE OF SUPPORTING OPERATION DATA OF DIFFERENT BIT WIDTHS

(71) Applicant: Cambricon Technologies Corporation Limited, Beijing (CN)

(72) Inventors: Tianshi Chen, Beijing (CN); Qi Guo, Beijing (CN); Zidong Du, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/268,457

(22) Filed: Feb. 5, 2019

(65) Prior Publication Data

US 2019/0236442 A1    Aug. 1, 2019

Related U.S. Application Data

(63) Continuation-in-part of application No. PCT/CN2017/093159, filed on Jul. 17, 2017.

(30) Foreign Application Priority Data

Aug. 5, 2016 (CN) .......................... 2016 1 0640111

(51) Int. Cl.
*G06N 3/06* (2006.01)
*G06F 9/22* (2006.01)
(Continued)

(52) U.S. Cl.
CPC ............... *G06N 3/06* (2013.01); *G06F 9/226* (2013.01); *G06F 9/30036* (2013.01); *G06F 9/30185* (2013.01); *G06F 9/3838* (2013.01)

(58) Field of Classification Search
CPC ..................................................... G06N 3/06
(Continued)

(56) References Cited

U.S. PATENT DOCUMENTS

| 5,471,633 A | * | 11/1995 | Colwell | .............. G06F 9/30112 712/216 |
| 5,590,352 A | * | 12/1996 | Zuraski, Jr. | ......... G06F 9/30014 712/23 |
| 2002/0056035 A1 | * | 5/2002 | Rozenshein | ........ G06F 9/30018 712/208 |

FOREIGN PATENT DOCUMENTS

| CN | 102012876 A | 4/2011 |
| CN | 102238348 A | 11/2011 |
| CN | 103188487 A | 7/2013 |

OTHER PUBLICATIONS

Chen, et al., "A Small-Footprint Accelerator for Large-Scale Neural Networks", ACM Transactions on Computer Systems, vol. 33, No. 2, Article 6, May 2015, 27 pages.
(Continued)

*Primary Examiner* — Tan V Mai
(74) *Attorney, Agent, or Firm* — Getech Law LLC; Jun Ye

(57) ABSTRACT

Aspects for supporting operation data of different bit widths in neural networks are described herein. The aspects may include a processing module that includes one or more processors. The processor may be capable of processing data of one or more respective bit-widths. Further, the aspects may include a determiner module configured to receive one or more instructions that include one or more operands and one or more width fields. The operands may correspond to one or more operand types and each of the width fields may indicate an operand bit-width of one operand type. The determiner module may be further configured to identify at least one operand bit-widths that is greater than each of the bit-widths. In addition, the aspects may include a processor combiner configured to designate a combination of two or more of the processors to process the operands.

30 Claims, 7 Drawing Sheets

(51) Int. Cl.
*G06F 9/30* (2018.01)
*G06F 9/38* (2018.01)

(58) Field of Classification Search
USPC .......................................................... 708/505
See application file for complete search history.

(56) References Cited

OTHER PUBLICATIONS

Du, et al., "An Accelerator for High Efficient Vision Processing", IEEE Transactions on Computer-aided Design of Integrated Circuits and System, vol. 36, No. 2, Feb. 2017, pp. 227-240.

Liu, et al., "Cambricon: An Instruction Set Architecture for Neural Networks", 2016 ACM/IEEE 43rd Annual International Symposium on Computer Architecture, Oct. 12, 2016, pp. 393-405.

Zhang, et al., "Cambricon-X" An Accelerator for Sparse Neural Networks, The 49th Annual IEEE/ACM International Symposium on Microarchitecture Article No. 20, Oct. 15, 2016, 12 pages.

Chen, et al., "DaDianNao: A Machine-Learning Supercomputer", 2014 47th Annual IEEE/ACM International Symposium on Microarchitecture, Dec. 13, 2014, pp. 609-622.

Luo, et al., "DaDianNao: A Neural Network Supercomputer", IEEE Transaction on Computers, vol. 66, No. 1, Jan. 2017, pp. 73-88.

Chen, et al., "DianNao: A Small-Footprint High-Throughput Accelerator for Ubiquitous Machine-Learning", ASPLOS 14, Proceedings of the 19th international conference on Architectural Support for Programming Languages and Operating Systems, Mar. 1-5, 2014, pp. 269-283.

Chen, et al., "DianNao Family: Energy-Efficient Hardware Accelerators for Machine Learning", Communications of he ACM, vol. 59, No. 11, Nov. 2016, pp. 105-112.

Liu, et al., "PuDianNao: A Polyvalent Machine Learning Accelerator", ASPLOS '15 Proceedings of the Twentieth International Conference on Architectural Support for Programming Languages and Operating Systems, Mar. 14-18, 2015, pp. 369-381.

Du, et al., "ShiDianNao: Shifting Vision Processing Closer to the Sensor", ISCA '15 Proceedings of the 42nd Annual International Symposium on Computer Architecture, Jun. 13-17, 2015, pp. 92-104.

PCT/CN2017/093159, International Search Report, dated Oct. 17, 2017, 4 pages.

* cited by examiner

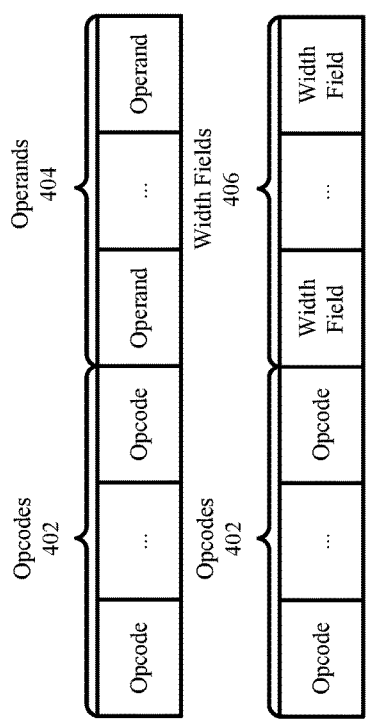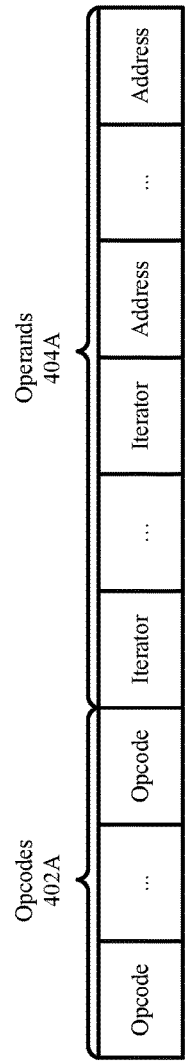
Fig. 4
Fig. 4A

OPERATION UNIT, METHOD AND DEVICE CAPABLE OF SUPPORTING OPERATION DATA OF DIFFERENT BIT WIDTHS

CROSS-REFERENCE TO RELATED APPLICATIONS

The present invention is a continuation-in-part of PCT Application No. PCT/CN2017/093159, filed on Jul. 17, 2017, which claims priority to commonly owned CN Application No. 201610640111.8, filed on Aug. 5, 2016. The entire contents of each of the aforementioned applications are incorporated herein by reference.

BACKGROUND

Multilayer neural networks (MNN) are widely applied to the fields such as pattern recognition, image processing, functional approximation, and optimal computation. In recent years, due to the higher recognition accuracy and better parallelizability, multilayer artificial neural networks have received increasing attention by academic and industrial communities.

Different types of data generated in neural networks may be processed at different levels of precision. In other words, bit-widths for each data type may be set differently. Conventionally, a general-purpose processor configured to process data of a fixed bit-width, e.g., a 32-bit CPU, may be implemented to process the different types of neural network data. However, processing data of a shorter bit-width may lead to unnecessary power consumption.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for neural network processing. The example apparatus may include a processing module that includes one or more processors that are capable of processing data of one or more respective bit-widths. The example apparatus may further include a determiner module configured to receive one or more instructions that include one or more operands and one or more width fields. The one or more operands may correspond to one or more operand types and each of the one or more width fields indicates an operand bit-width of one of the one or more operand types. The determiner module may be further configured to identify at least one of the one or more operand bit-widths that is greater than each of the one or more bit-widths and transmit the operands that correspond to the at least one of the one or more operand bit-widths. Further, the example apparatus may include a processor combiner configured to designate a combination of two or more of the processors to process the operands that correspond to the at least one of the operand bit-widths.

Another example aspect of the present disclosure provides an example method for neural network processing. The example method may include receiving, by a determiner module, one or more instructions that include one or more operands and one or more width fields. The example method may further include identifying, by the determiner module, at least one of the one or more operand bit-widths that is greater than each of one or more bit-widths that one or more processors in a processing module are respectively capable of processing. Further still, the example method may include transmitting, by the determiner module, the operands that correspond to the at least one operand bit-width to a processor combiner. In addition, the example method may include designating, by the processor combiner, a combination of two or more of the processors to process the operands that correspond to the at least one of the operand bit-widths.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3A illustrates a detailed example format of the example instruction;

FIG. 3B illustrates another detailed example format of the example instruction;

FIG. 3C illustrates yet another detailed example format of the example instruction;

FIG. 3D illustrates yet another detailed example format of the example instruction;

FIG. 4 illustrates two example instructions that respectively include the one or more fields indicating different bit-widths and the one or more operands;

FIG. 4A illustrates two detailed example formats of the two example instructions;

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding of the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Figure 1:
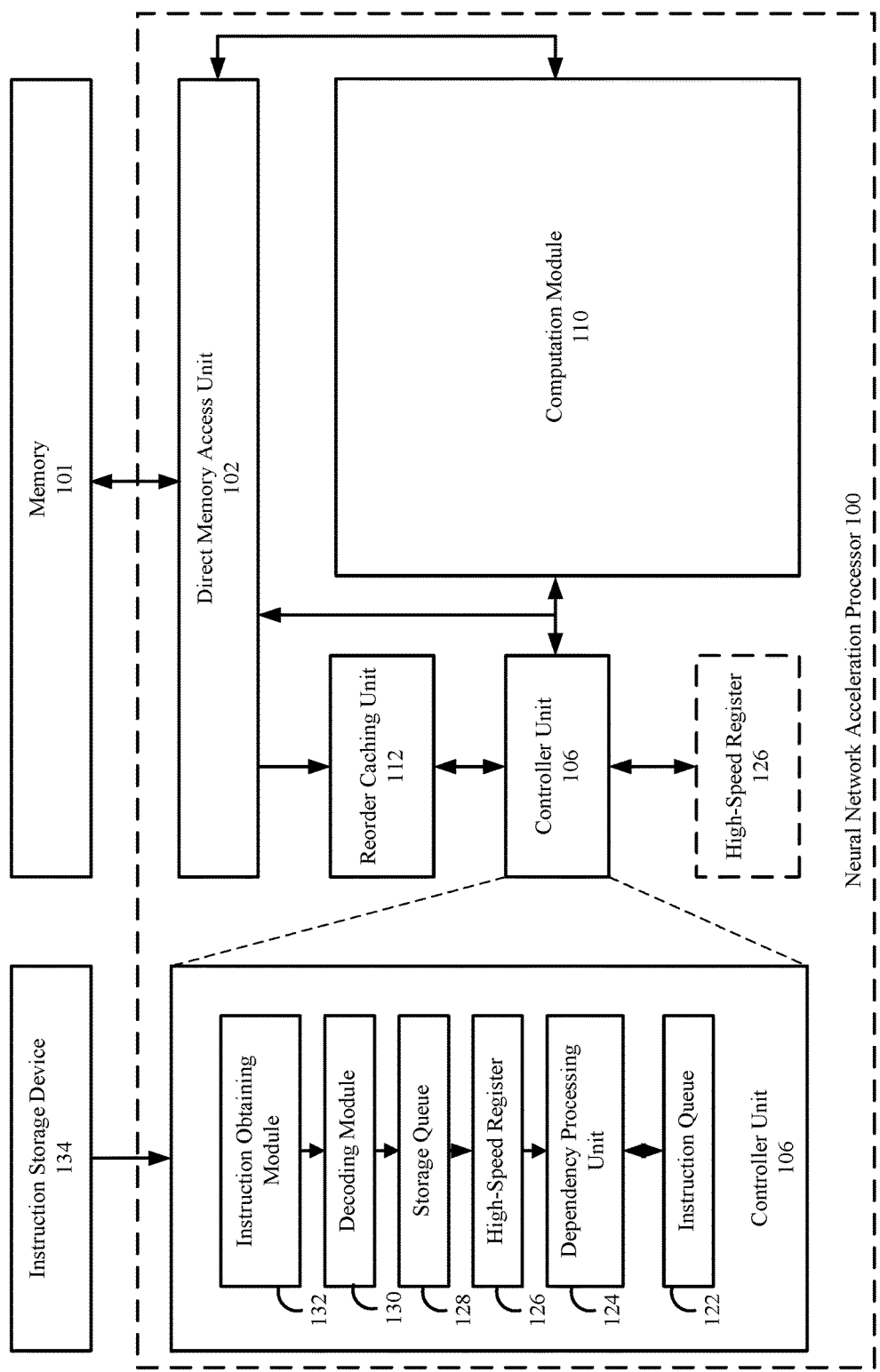
FIG. 1 illustrates a block diagram of an example neural network acceleration processor that supports neural network data of different bit-widths.

FIG. 1 illustrates a block diagram of an example neural network acceleration processor 100 that supports neural network data of different bit-widths. As depicted, the example neural network acceleration processor 100 may include a controller unit 106, a direct memory access unit 102, a computation module 110, and a reorder caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, an instruction storage device 134 external to the neural network acceleration processor 100 may be configured to store one or more instructions to process neural network data. The controller unit 106 may be configured to receive the one or more instructions from the instruction storage device 134. In more detail, an instruction obtaining module 132 may be configured to obtain the one or more instructions from the instruction storage device 134 and transmit the one or more instructions to a decoding module 130.

The decoding module 130 may be configured to decode the one or more instructions respectively into one or more micro-instructions. Each of the one or more instructions may include one or more opcodes that respectively indicate one operation to be performed to a set of neural network data. In more detail, the decoding module 130 may further include an instruction reception module, a micro-instruction generator, a micro-instruction queue, and a micro-instruction transmission module. The instruction reception module may be configured to receive the one or more instructions from the instruction obtaining module 132. The micro-instruction generator may be configured to parse the one or more instructions respectively into the one or more micro-instructions that may be temporarily stored in the micro-instruction queue. The micro-instruction transmission module may be configured to sequentially transmit the one or more micro-instructions to a storage queue 128. The storage queue 128 may be configured to temporarily store the micro-instructions and a high-speed register 126 may be configured to store scalar values or other data that may be required by the operations indicated by the one or more instruction. In some other examples, the high-speed register 126 may be implemented external to the controller unit 106.

The micro-instructions may be further transmitted from the storage queue 128 to a dependency processing unit 124. The dependency processing unit 124 may be configured to determine whether at least one of the instructions has a dependency relationship with the data of the previous instruction that is being executed. The one or more instructions may be stored in the storage queue 128 until there is no dependency relationship with the data with the previous instruction that has not finished executing. If the dependency relationship does not exist, the decoding module 130 may be configured to decode one of the instructions into micro-instructions for controlling operations of other modules including the direct memory access unit 102 and the computation module 110.

The example neural network acceleration processor 100 may further include a reorder caching unit 112. The reorder caching unit 112 may be configured to store the instruction that is being executed until results of the instruction are transmitted to the direct memory access unit 102 or stored in the high-speed register 126. The results of the instruction may be transmitted when the instruction is stored as a first one in a queue in the reorder caching unit 112.

Upon receiving the one or more instructions from the controller unit 106, the computation module 110 may be configured to perform operations in accordance with the one or more instructions. The operations may include convolution neural network forward propagation operations, convolution neural network backward propagation operations, pooling operations, full connection neural network operations, batch normalization operations, restricted Boltzmann machine (RBM) neural network operations, matrix-multiply-vector operations, out product operations, dot product operations, vector arithmetic operations, vector logic operations, transcendental function operations, vector comparison operations, maximum/minimum vector selection operations, vector bit-shifting operations, random vector generation operations, etc.

In some examples, an instruction may include one or more opcodes, one or more operands, and one or more width fields. The opcodes may respectively indicate operations to be performed by the computation module 110. The operands may include one or more immediate values for the operations and/or one or more addresses that indicate the locations in the high-speed register 126. The operands may respectively correspond to one or more operand types. The width fields in the instruction may describe a bit-width for each operand type. The formats of the instructions may be described in greater detail in accordance with FIGS. 3, 3A, 3B, 3C, 3D, 4, 4A, 4B, 4C, and 4D.

In some examples, the computation module 110 may include one or more processors that are capable of processing data of different bit-widths. For example, the computation module 110 may include one or more processors respectively capable of processing data of 8 bits, 16 bits, and 32 bits (respectively referred to as "8-bit processor," "16-bit processor," and "32-bit processor"). When the computation module 110 receives an instruction from the controller unit 106, the computation module 110 may be configured to select one of the processors or a combination of two or more of the processors based on the bit-widths indicated by the width fields in the instruction. For example, when the width fields in the instruction indicate that the operands are of 8 bits, the computation module 110 may be configured to select the 8-bit processor to process the operands. When the width fields in the instruction indicate that the operands are of 40 bits, the computation module 110 may be configured to select a combination of the 8-bit processor and the 32-bit processor to process the operands of 40 bits such that a total count of the selected processors is minimum.

Figure 2:
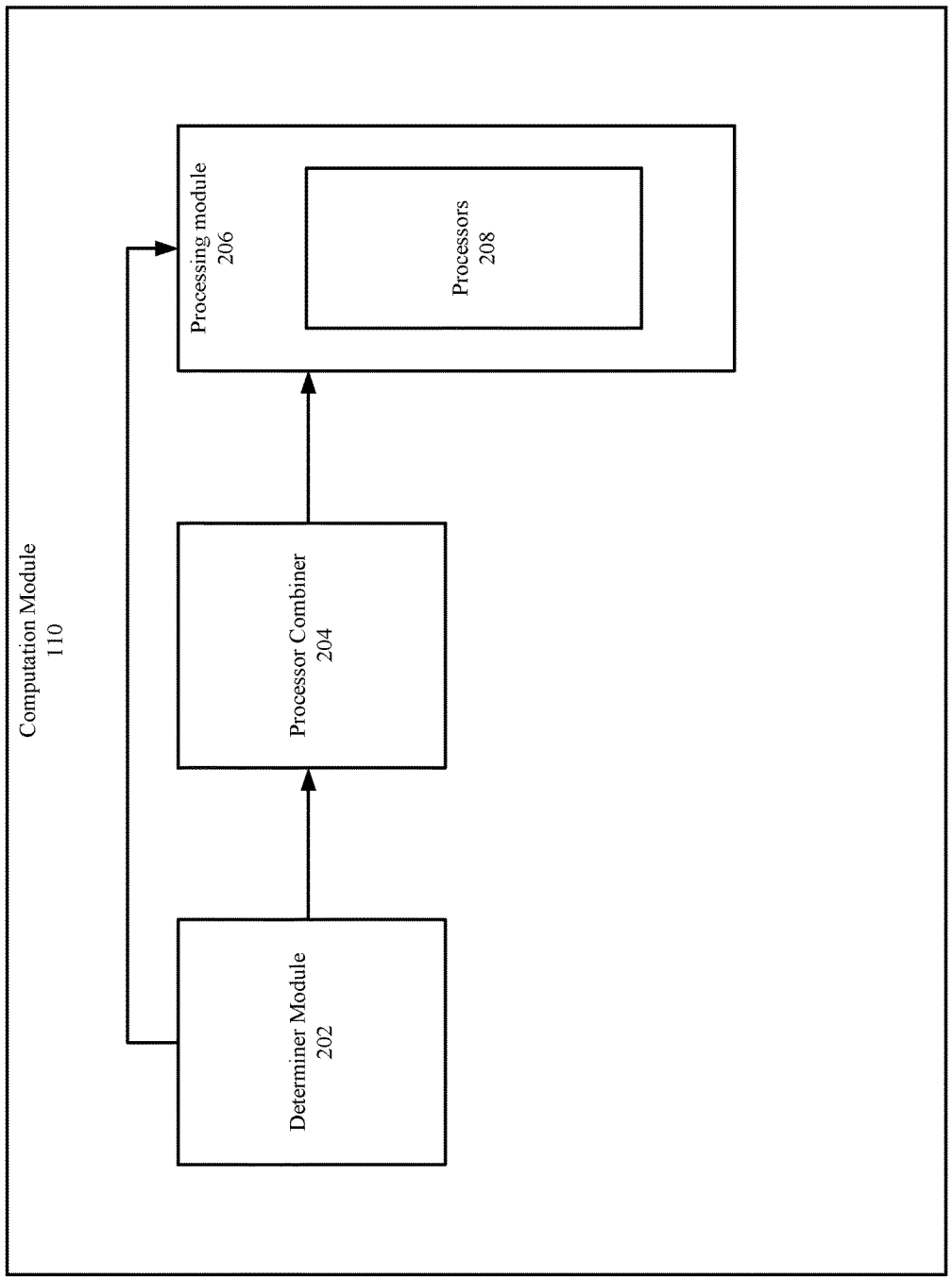
FIG. 2 illustrates a block diagram of an example computation module that supports neural network data of different bit-widths.

FIG. 2 illustrates a block diagram of an example computation module 110 that supports neural network data of different bit-widths. As depicted, the example computation module 110 may include a determiner module 202, a processor combiner 204, and a processing module 206 that may further include one or more processors 208.

In some example, the determiner module 202 may be configured to receive the one or more instructions. In some examples, each of the one or more instructions may include one or more opcodes, one or more operands, and one or more width fields. In some other examples, one instruction may include one or more opcodes and one or more operands while another corresponding instruction may include the same opcodes and one or more width fields. As described above, the operands may correspond to one or more operand types and each of the width fields may indicate an operand bit-width for an operand type.

Based on the received one or more instructions, the determiner module 202 may be configured to determine whether a single processor of the processors 208 is capable of processing the operands or data identified by the operands. In other words, the determiner module 202 may be configured to identify at least one of the operand bit-widths that is greater than the bit-widths that can be processed by processors 208.

For example, if the width fields in the received instructions indicate that the operands are of 8 bits and the processors 208 include an 8-bit processor, the determiner module 202 may be configured to directly transmit the operands and the opcodes to the 8-bit processor for further operations. If the processors 208 do not include one processor that is capable of processing data of the bit-widths identified by the width fields, the determiner module 202 may be configured to identify the operands corresponding to the width fields. For example, the processors 208 may include one or more 8-bit processors, one or more 16-bit processors, and one or more 32-bit processors. When at least one of the operand bit-widths of the operands is greater than 32 bits, the determiner module 202 may identify the operands of the at least one operand bit-widths and transmit the operands to the processor combiner 204.

The processor combiner 204 may be configured to designate a combination of two or more of the processors 208 to process the operands or the data identified by the operands.

To identify the combination of processors, the processor combiner 204 may be configured to select processors of longer bit-widths over the processors of shorter bit-widths for processing the operands. For example, the processors 208 may include one or more 8-bit processors, one or more 16-bit processors, and one or more 32-bit processors. When the width fields in the instructions indicate that the operands or the data identified by the operands are of 64 bits, the processor combiner 204 may be configured to identify two 32-bit processors to process the operands, rather than eight 8-bit processors. The identification of the combination of processors may be transmitted by the processor combiner 204 to the processing module 206.

The processing module 206 may be configured to instruct the processors identified by the processor combiner 204 to process the operands or the data identified by the operands. Results of the processing may be transmitted to the direct memory access unit 102.

Figure 3:
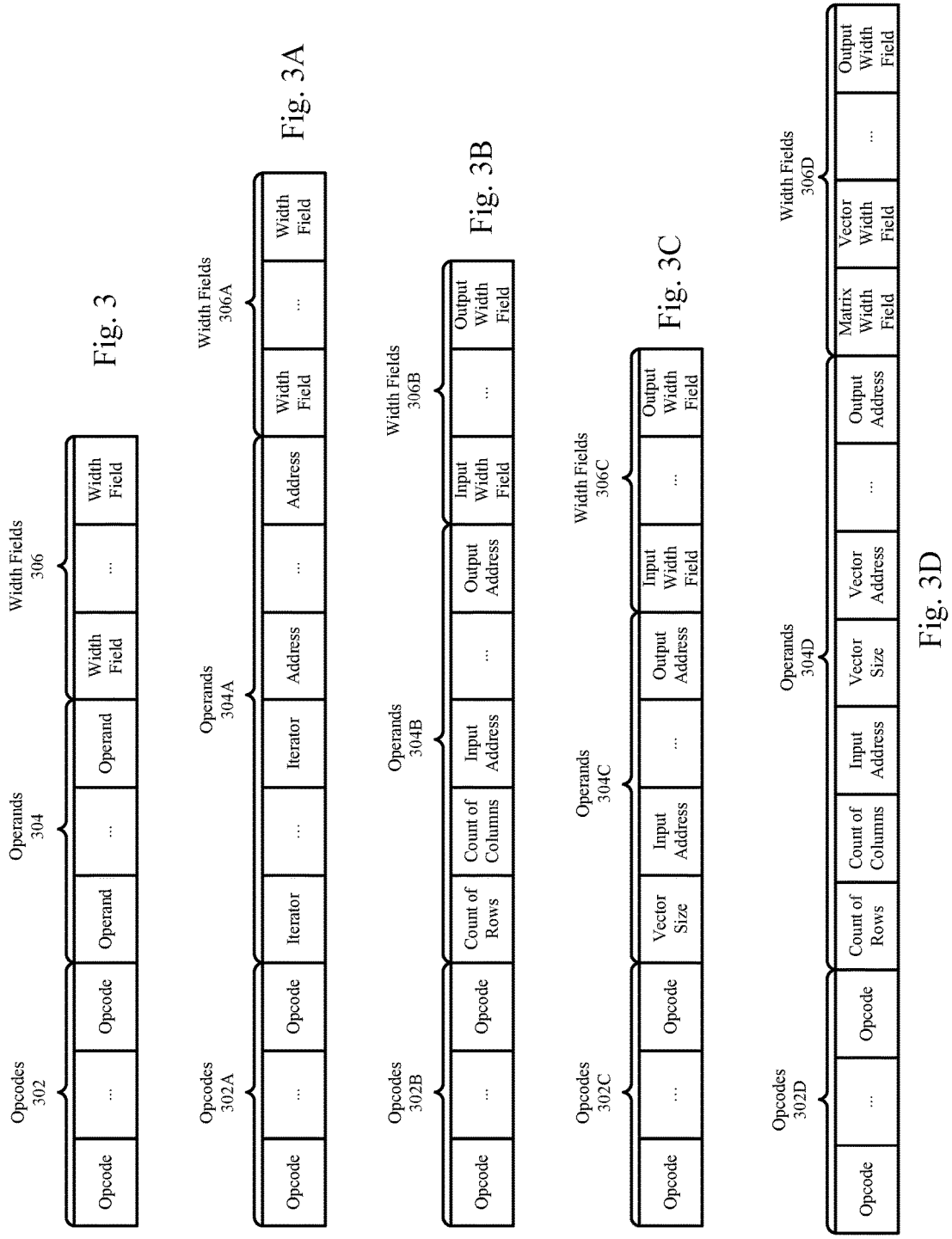
FIG. 3 illustrates an example instruction that includes one or more fields that indicate different bit-widths and one or more operands.

FIG. 3 illustrates an example instruction that includes one or more fields that indicate different bit-widths and one or more operands. As depicted, an instruction received by the computation module 110 may include one or more opcodes 302, one or more operands 304, and one or more width fields 306.

Each of the opcodes 302 may indicate an operation to be performed by the processors 208. Each of the operands 304 may include an immediate value or an address in the high-speed register 126 that stores the data for processing. The operands 304 may be categorized into different operand types. Each operand type may be associated with an operand bit-width. The width fields 306 may respectively include a bit-width value for each operand type.

FIG. 3A illustrates a detailed example format of the example instruction.

As depicted, the detailed example format of the example instruction may include one or more opcodes 302A, sixteen operands 304A, and four width fields 306A. The sixteen operands 304A may further include twelve iterators and four addresses. The twelve iterators may respectively correspond to the four addresses. For example, the first three iterators may correspond to the first address. A multiplication of the three iterators may indicate a count of operations to be repetitively performed in accordance with the example instruction.

The four addresses may correspond to four different operand types. The four width fields 306A may respectively indicate four different bit-width corresponding to the four different operand types.

FIG. 3B illustrates another detailed example format of the example instruction.

As depicted, the detailed example format of the example instruction may include one or more opcodes 302B, at least four operands 304B, and at least two width fields 306B. The at least four operands 304B may include a count of rows in a matrix, a count of columns in the matrix, an input address, and an output address. The input address may indicate a starting address of the matrix and the output address may indicate a destination address for storing results of the processing by the computation module 110. The at least two width fields 306B may respectively indicate two bit-widths corresponding to the input address and the output address.

FIG. 3C illustrates yet another detailed example format of the example instruction.

As depicted, the detailed example format of the example instruction may include one or more opcodes 302C, at least three operands 304C, and at least two width fields 306C. The at least three operands 304C may further include a size of a vector, an input address, and an output address. The input address may indicate a starting address in the high-speed register 126 of the vector and the output address may indicate a destination address in the high-speed register 126 for results of the processing by the processors 208. The at least two width fields 306C may respectively indicate two bit-widths corresponding to the input address and the output address.

FIG. 3D illustrates yet another detailed example format of the example instruction.

As depicted, the detailed example format of the example instruction may include one or more opcodes 302D, at least six operands 304D, and at least three width fields 306D. The at least six operands 304D may include a count of rows of a matrix, a count of columns of the matrix, a starting address of the matrix, a size of a vector, a starting address of the vector, and an output address. The three width fields 306D may respectively indicate three bit-widths corresponding to the starting address of the matrix, the starting address of the vector, and the output address.

FIG. 4 illustrates two example instructions that respectively include the one or more fields indicating different bit-widths and the one or more operands.

As depicted, a first instruction may include one or more opcodes 402 and one or more operands and a second instruction may include the same opcodes 402 and one or more width fields 406. Similarly, each of the opcodes 402 may indicate an operation to be performed by the processors 208. Each of the operands 404 may include an immediate value or an address in the high-speed register 126 that stores the data for processing. The operands 404 may be categorized into different operand types. Each operand type may be associated with an operand bit-width. The width fields 406 may respectively include a bit-width value for each operand type.

FIG. 4A illustrates two detailed example formats of the two example instructions.

As depicted, a first detailed example format may include one or more opcodes 402A and sixteen operands 404A and a second detailed example format may include the same opcodes 402A and four width fields 406A. Similarly, the sixteen operands 404A may further include twelve iterators and four addresses. The four addresses may correspond to four different operand types. The four width fields 406A may respectively indicate four different bit-width corresponding to the four different operand types.

Figure 4B:
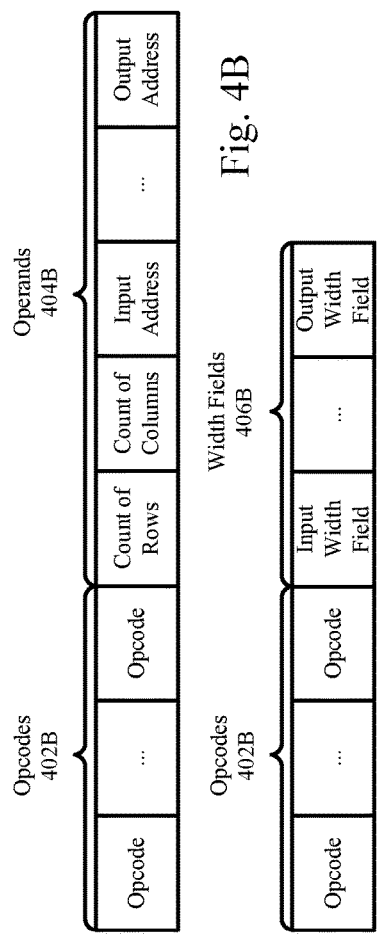
FIG. 4B illustrates other two detailed example formats of the two example instructions.

FIG. 4B illustrates other two detailed example formats of the two example instructions.

As depicted, a first detailed example format may include one or more opcodes 402B and at least four operands 404B and a second detailed example format may include the same opcodes 402B and at least two width fields 406B. Similarly, the at least four operands 404B may include a count of rows in a matrix, a count of columns in the matrix, an input address, and an output address. The input address may indicate a starting address of the matrix and the output address may indicate a destination address for storing results of the processing by the computation module 110. The at least two width fields 406B may respectively indicate two bit-widths corresponding to the input address and the output address.

Figure 4C:
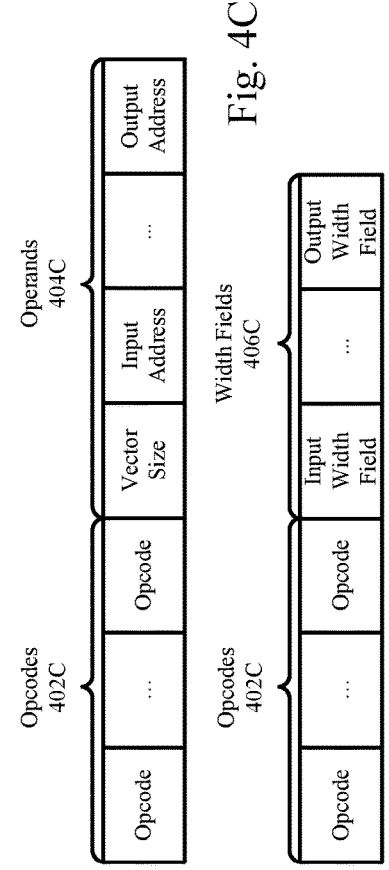
FIG. 4C illustrates yet other two detailed example formats of the two example instructions.

FIG. 4C illustrates yet other two detailed example formats of the two example instructions.

As depicted, a first detailed example format may include one or more opcodes 402C and at least three operands 404C and a second detailed example format may include the same opcodes 402C and at least two width fields 406C. Similarly, the at least three operands 404C may further include a size of a vector, an input address, and an output address. The input address may indicate a starting address in the high-speed register 126 of the vector and the output address may indicate a destination address in the high-speed register 126 for results of the processing by the processors 208. The at least two width fields 406C may respectively indicate two bit-widths corresponding to the input address and the output address.

Figure 4D:
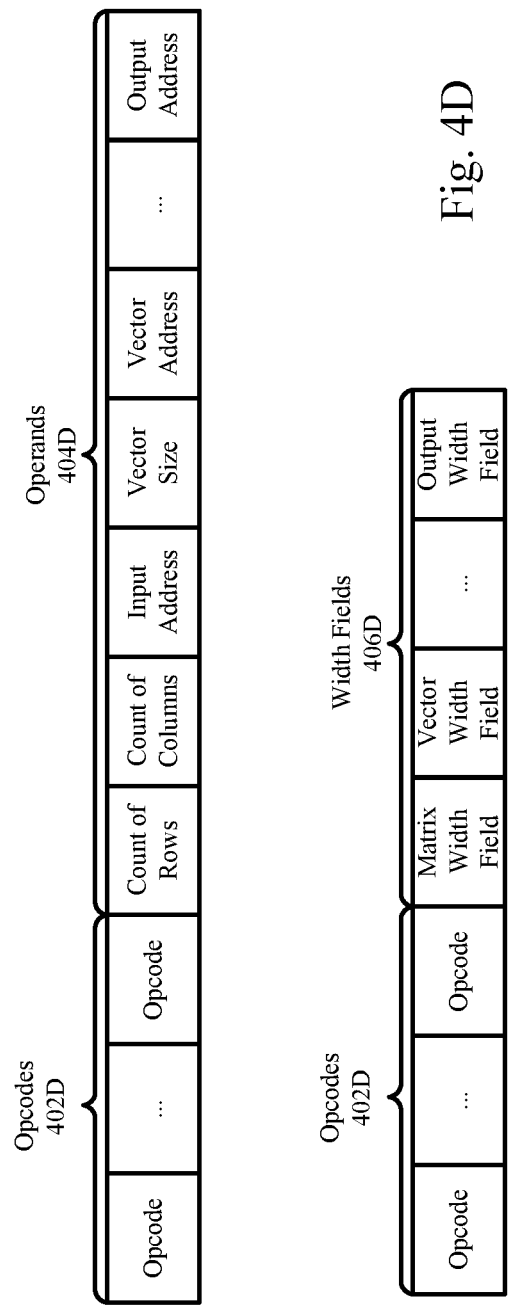
FIG. 4D illustrates other two detailed example formats of the two example instructions.

FIG. 4D illustrates other two detailed example formats of the two example instructions.

As depicted, a first detailed example format may include one or more opcodes 402D and at least six operands 404D and a second detailed example format may include the same opcodes 402D and at least three width fields 406D. Similarly, the at least six operands 404D may include a count of rows of a matrix, a count of columns of the matrix, a starting address of the matrix, a size of a vector, a starting address of the vector, and an output address. The three width fields 406D may respectively indicate three bit-widths corresponding to the starting address of the matrix, the starting address of the vector, and the output address.

Figure 5:
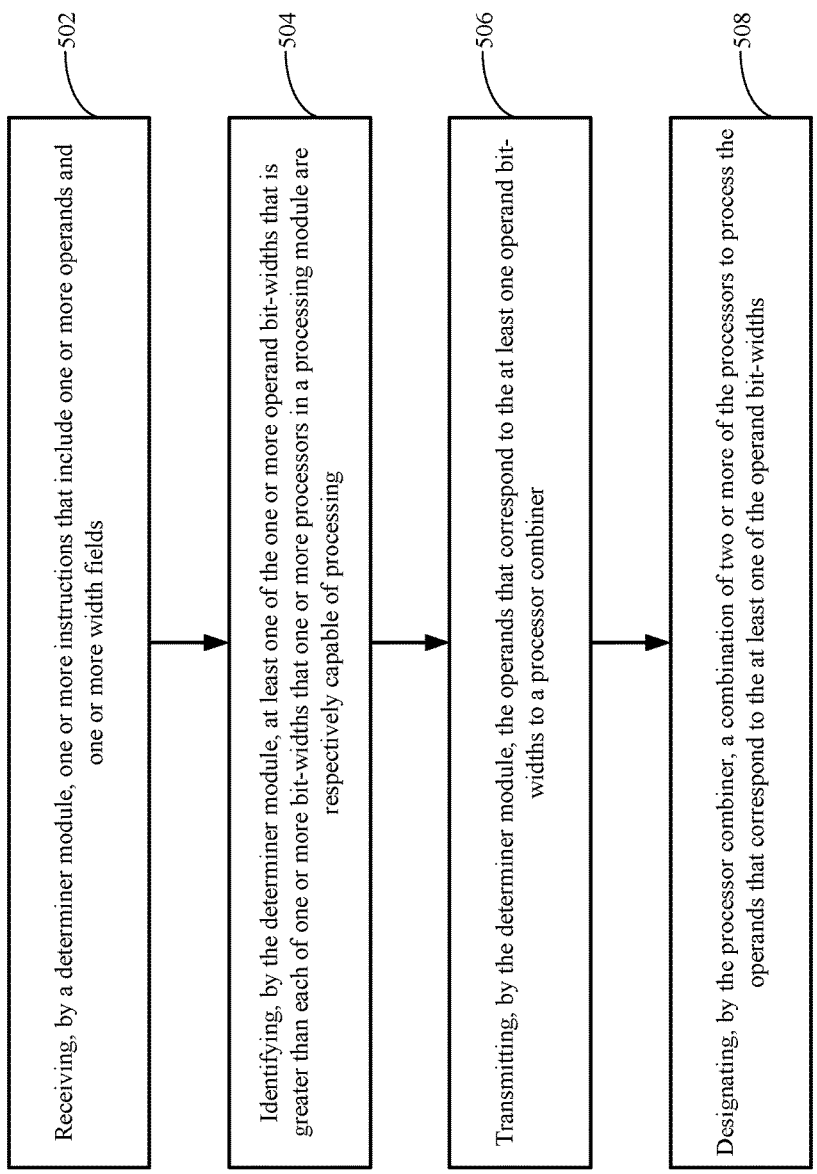
FIG. 5 illustrates a flow chart of an example method for processing neural network data of different bit-widths.

FIG. 5 illustrates a flow chart of an example method 500 for processing neural network data of different bit-widths. The example method 500 may be performed by one or more components of the apparatus of FIGS. 1 and 2.

At block 502, the example method 500 may include receiving, by a determiner module, one or more instructions that include one or more operands and one or more width fields. For example, the determiner module 202 may be configured to receive the one or more instructions. In some examples, each of the one or more instructions may include one or more opcodes, one or more operands, and one or more width fields. In some other examples, one instruction may include one or more opcodes and one or more operands while another corresponding instruction may include the same opcodes and one or more width fields. As described above, the operands may correspond to one or more operand types and each of the width fields may indicate an operand bit-width for an operand type.

At block 504, the example method 500 may include identifying, by the determiner module, at least one of the one or more operand bit-widths that is greater than each of one or more bit-widths that one or more processors in a processing module are respectively capable of processing. For example, based on the received one or more instructions, the determiner module 202 may be configured to determine whether a single processor of the processors 208 is capable of processing the operands or data identified by the operands. In other words, the determiner module 202 may be configured to identify at least one of the operand bit-widths that is greater than the bit-widths that can be processed by processors 208.

If the processors 208 do not include one processor that is capable of processing data of the bit-widths identified by the width fields, the determiner module 202 may be configured to identify the operands corresponding to the width fields. For example, the processors 208 may include one or more 8-bit processors, one or more 16-bit processors, and one or more 32-bit processors. When at least one of the operand bit-widths of the operands is greater than 32 bits, the determiner module 202 may identify the operands of the at least one operand bit-widths and transmit the operands to the processor combiner 204.

At block 506, the example method 500 may include transmitting, by the determiner module, the operands that correspond to the at least one operand bit-widths to a processor combiner. For example, the determiner module 202 may be configured to transmit the identified operands that correspond to the at least one operand bit-widths to the processor combiner 204.

At block 508, the example method 500 may include designating, by the processor combiner, a combination of two or more of the processors to process the operands that correspond to the at least one of the operand bit-widths. For example, the processor combiner 204 may be configured to designate a combination of two or more of the processors 208 to process the operands or the data identified by the operands. To identify the combination of processors, the processor combiner 204 may be configured to select processors of longer bit-widths over the processors of shorter bit-widths for processing the operands. For example, the processors 208 may include one or more 8-bit processors, one or more 16-bit processors, and one or more 32-bit processors. When the width fields in the instructions indicate that the operands or the data identified by the operands are of 64 bits, the processor combiner 204 may be configured to identify two 32-bit processors to process the operands, rather than eight 8-bit processors. The identification of the combination of processors may be transmitted by the processor combiner 204 to the processing module 206.

The process or method described in the above accompanying figures can be performed by process logic including hardware (for example, circuit, specific logic etc.), firmware, software (for example, a software being externalized in a non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for neural network processing, comprising:
   a processing module that includes multiple processors, wherein the multiple processors are capable of processing data of one or more respective bit-widths;
   a determiner module configured to:
      receive one or more instructions that include one or more operands and one or more width fields,
         wherein the one or more operands correspond to one or more operand types, and
         wherein each of the one or more width fields indicates an operand bit-width of one of the one or more operand types, and
      identify at least one of the one or more operand bit-widths that is greater than each of the one or more bit-widths,
      transmit the operands that correspond to the at least one of the one or more operand bit-widths; and
   a processor combiner configured to designate a combination of two or more of the multiple processors to process the operands that correspond to the at least one of the operand bit-widths.

2. The apparatus of claim 1, wherein the one or more operands and the one or more width fields are included in one of the one or more instructions.

3. The apparatus of claim 1, wherein the one or more operands are included in a first instruction and the one or more width fields are included in a second instruction.

4. The apparatus of claim 1, wherein the one or more instructions include one or more opcodes that indicate operations to be performed by the multiple processors.

5. The apparatus of claim 1, further comprising a caching unit configured to store data identified by the one or more operands.

6. The apparatus of claim 1, wherein the one or more operands in one of the one or more instructions include one or more iterators and one or more addresses, and wherein each of the one or more addresses corresponds to one of the width fields.

7. The apparatus of claim 1, wherein the one or more operands in one of the one or more instructions include at least a column count of a matrix, at least a row count of the matrix, at least one input address, or at least one output address, and wherein the input address and the output address respectively correspond to one of the width fields.

8. The apparatus of claim 1, wherein the one or more operands in one of the one or more instructions include at least one vector size, at least one input address, or at least one output address, and wherein the input address and the output address respectively correspond to one of the width fields.

9. The apparatus of claim 1, wherein the one or more operands in one of the one or more instructions include at least a column count of a matrix, at least a row count of the matrix, at least a vector size, at least one input address, at least one vector address, or at least one output address, and wherein the at least one input address, the at least one vector address, and the at least one output address respectively correspond to one of the width fields.

10. The apparatus of claim 1, further comprising a controller unit configured to transmit the one or more instructions to the determiner module.

11. The apparatus of claim 10, wherein the controller unit includes an instruction obtaining module configured to obtain the one or more instruction from an instruction storage device.

12. The apparatus of claim 11, wherein the controller unit includes a decoding module configured to decode each of the one or more instructions into respective one or more micro-instructions.

13. The apparatus of claim 12, wherein the controller unit includes a high-speed register configured to store scalar values included in the one or more instructions.

14. The apparatus of claim 13, wherein the controller unit includes a dependency processing unit configured to determine whether at least one of the one or more instructions has a dependency relationship with a previously received instruction.

15. The apparatus of claim 14, wherein the controller unit includes a storage queue module configured to store the one or more instructions while the dependency processing unit is determining an existence of the dependency relationship.

16. A method for neural network processing, comprising:
receiving, by a determiner module, one or more instructions that include one or more operands and one or more width fields,
wherein the one or more operands correspond to one or more operand types, and
wherein each of the one or more width fields indicates an operand bit-width of one of the one or more operand types;
identifying, by the determiner module, at least one of the one or more operand bit-widths that is greater than each of one or more bit-widths that multiple processors in a processing module are respectively capable of processing;
transmitting, by the determiner module, the operands that correspond to the at least one operand bit-widths to a processor combiner;
designating, by the processor combiner, a combination of two or more of the multiple processors to process the operands that correspond to the at least one of the operand bit-widths.

17. The method of claim 16, wherein the one or more operands and the one or more width fields are included in one of the one or more instructions.

18. The method of claim 16, wherein the one or more operands are included in a first instruction and the one or more width fields are included in a second instruction.

19. The method of claim 16, wherein the one or more instructions include one or more opcodes that indicate operations to be performed by the multiple processors.

20. The method of claim 16, further comprising storing, by a caching unit, data identified by the one or more operands.

21. The method of claim 16, wherein the one or more operands in one of the one or more instructions include one or more iterators and one or more addresses, and wherein each of the one or more addresses corresponds to one of the width fields.

22. The method of claim 16, wherein the one or more operands in one of the one or more instructions include at least a column count of a matrix, at least a row count of the matrix, at least one input address, or at least one output address, and wherein the input address and the output address respectively correspond to one of the width fields.

23. The method of claim 16, wherein the one or more operands in one of the one or more instructions include at least one vector size, at least one input address, or at least one output address, and wherein the input address and the output address respectively correspond to one of the width fields.

24. The method of claim 16, wherein the one or more operands in one of the one or more instructions include at least a column count of a matrix, at least a row count of the matrix, at least a vector size, at least one input address, at least one vector address, or at least one output address, and wherein the at least one input address, the at least one vector address, and the at least one output address respectively correspond to one of the width fields.

25. The method of claim 16, further comprising transmitting, by a controller unit, the one or more instructions to the determiner module.

26. The method of claim 25, further comprising obtaining, by an instruction obtaining module of the controller unit, the one or more instruction from an instruction storage device.

27. The method of claim 26, further comprising decoding, by a decoding module of the controller unit, each of the one or more instructions into respective one or more micro-instructions.

28. The method of claim 27, further comprising storing, by a high-speed register of the controller unit, scalar values included in the one or more instructions.

29. The method of claim 28, further comprising determining, by a dependency processing unit of the controller unit, whether at least one of the one or more instructions has a dependency relationship with a previously received instruction.

30. The method of claim 29, further comprising storing, by a storage queue module, the one or more instructions while the dependency processing unit is determining an existence of the dependency relationship.

* * * * *